United States Patent
Smith et al.

(10) Patent No.: US 12,390,760 B2
(45) Date of Patent: Aug. 19, 2025

(54) ATMOSPHERIC WATER HARVESTER WITH HIGH EFFICIENCY, AND METHODS OF USING THEREOF

(71) Applicant: Water Harvesting, Inc., Newark, CA (US)

(72) Inventors: Taber Hardesty Smith, Saratoga, CA (US); David S. Kuo, Palo Alto, CA (US); Ievgen A. Kapustin, Berkeley, CA (US); Bruno Marchon, Palo Alto, CA (US); Faisal Shafikurrehman Maniar, San Jose, CA (US)

(73) Assignee: Water Harvesting, Inc., Fremont, CA (US)

( * ) Notice: Subject to any disclaimer, the term of this patent is extended or adjusted under 35 U.S.C. 154(b) by 0 days.

(21) Appl. No.: 17/797,969

(22) PCT Filed: Feb. 2, 2021

(86) PCT No.: PCT/US2021/016261
§ 371 (c)(1),
(2) Date: Aug. 5, 2022

(87) PCT Pub. No.: WO2021/162894
PCT Pub. Date: Aug. 19, 2021

(65) Prior Publication Data
US 2023/0338891 A1 Oct. 26, 2023

Related U.S. Application Data

(60) Provisional application No. 63/053,428, filed on Jul. 17, 2020, provisional application No. 62/976,824, filed on Feb. 14, 2020.

(51) Int. Cl.
*B01D 53/08* (2006.01)
*B01D 5/00* (2006.01)
(Continued)

(52) U.S. Cl.
CPC ......... *B01D 53/261* (2013.01); *B01D 5/0006* (2013.01); *B01D 53/06* (2013.01);
(Continued)

(58) Field of Classification Search
CPC ............................... B01D 53/08; B01D 53/06
See application file for complete search history.

(56) References Cited

U.S. PATENT DOCUMENTS

| 1,559,762 A | 11/1925 | Newman |
| 4,180,985 A | 1/1980 | Northrup, Jr. |

(Continued)

FOREIGN PATENT DOCUMENTS

| CA | 3120865 | 7/2023 |
| CN | 102639540 A | 8/2012 |

(Continued)

OTHER PUBLICATIONS

Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.
(Continued)

*Primary Examiner* — Robert A Hopkins
(74) *Attorney, Agent, or Firm* — Craig R. Miles; CR MILES P.C.

(57) ABSTRACT

Provided herein are water harvesting systems, as well as methods using such systems, for capturing water from surrounding air. The systems and methods use water capture materials to adsorb water from the air. For example, the water capture materials may be metal-organic-frameworks. The systems and methods desorb this water in the form of water vapor, and the water vapor is condensed into liquid water and collected. The liquid water is suitable for use as drinking water.

15 Claims, 10 Drawing Sheets

(51) Int. Cl.
   *B01D 53/06* (2006.01)
   *B01D 53/26* (2006.01)
   *B01D 53/28* (2006.01)
   *E03B 3/28* (2006.01)

(52) U.S. Cl.
   CPC ........... *B01D 53/08* (2013.01); *B01D 53/265* (2013.01); *B01D 53/28* (2013.01); *E03B 3/28* (2013.01); *B01D 2253/204* (2013.01); *B01D 2257/80* (2013.01); *B01D 2259/40096* (2013.01)

(56) References Cited

U.S. PATENT DOCUMENTS

| | | | |
|---|---|---|---|
| 4,304,577 | A | 12/1981 | Ito et al. |
| 4,646,541 | A | 3/1987 | Reid et al. |
| 5,565,139 | A | 10/1996 | Walker et al. |
| 5,632,802 | A | 5/1997 | Grgich et al. |
| 5,632,954 | A | 5/1997 | Coellner et al. |
| 6,074,972 | A * | 6/2000 | Bratton .................. C09K 5/047 62/480 |
| 6,334,316 | B1 | 1/2002 | Maeda |
| 6,684,648 | B2 | 2/2004 | Faqih |
| 8,500,886 | B2 | 8/2013 | Okano |
| 8,627,673 | B2 | 1/2014 | Hill et al. |
| 8,864,882 | B2 | 10/2014 | Henning et al. |
| 9,134,038 | B2 | 9/2015 | Lee et al. |
| 9,446,969 | B1 | 9/2016 | Redman et al. |
| 10,168,057 | B2 | 1/2019 | Goldsworthy et al. |
| 10,266,737 | B2 | 4/2019 | Van Horn et al. |
| 10,695,741 | B2 | 6/2020 | Motkuri et al. |
| 10,829,913 | B1 | 11/2020 | Ahmed et al. |
| 10,857,855 | B2 | 12/2020 | Tomita et al. |
| 10,948,202 | B2 | 3/2021 | Lee et al. |
| 11,029,045 | B2 | 6/2021 | Woods et al. |
| 11,065,573 | B2 | 7/2021 | Matuska et al. |
| 11,679,339 | B2 | 6/2023 | Van de Mortel |
| 12,000,122 | B2 | 6/2024 | Yaghi et al. |
| 2004/0107832 | A1 | 6/2004 | Tongue et al. |
| 2004/0123615 | A1 | 7/2004 | Yabu |
| 2004/0123616 | A1 | 7/2004 | Lee et al. |
| 2004/0244398 | A1 | 12/2004 | Radermacher et al. |
| 2005/0044862 | A1 | 3/2005 | Vetrovec et al. |
| 2006/0130652 | A1 | 6/2006 | Takewaki et al. |
| 2007/0028769 | A1 | 2/2007 | Eplee et al. |
| 2009/0139254 | A1 | 6/2009 | Landry |
| 2009/0151368 | A1 | 6/2009 | Bar |
| 2009/0260385 | A1 | 10/2009 | Hill et al. |
| 2010/0126344 | A1 | 5/2010 | Stein et al. |
| 2010/0175557 | A1 | 7/2010 | Shih et al. |
| 2011/0056220 | A1 | 3/2011 | Caggiano |
| 2011/0088552 | A1 | 4/2011 | Ike et al. |
| 2011/0296858 | A1* | 12/2011 | Caggiano ............... B01D 53/28 219/679 |
| 2012/0172612 | A1 | 7/2012 | Yaghi et al. |
| 2013/0036913 | A1 | 2/2013 | Fukudome |
| 2013/0061752 | A1 | 3/2013 | Farha et al. |
| 2013/0192281 | A1 | 8/2013 | Nam et al. |
| 2013/0269522 | A1 | 10/2013 | DeValve |
| 2013/0312451 | A1 | 11/2013 | Max |
| 2014/0138236 | A1 | 5/2014 | White |
| 2014/0165637 | A1 | 6/2014 | Ma |
| 2014/0287150 | A1 | 9/2014 | Miljkovic et al. |
| 2014/0326133 | A1 | 11/2014 | Wang et al. |
| 2014/0338425 | A1 | 11/2014 | Kalbassi et al. |
| 2016/0030858 | A1 | 2/2016 | Giacomini |
| 2016/0084541 | A1 | 3/2016 | Aguado et al. |
| 2016/0334145 | A1 | 11/2016 | Pahwa et al. |
| 2017/0008915 | A1 | 1/2017 | Yaghi et al. |
| 2017/0113184 | A1 | 4/2017 | Eisenberger |
| 2017/0129307 | A1 | 5/2017 | Zhou et al. |
| 2017/0211851 | A1 | 7/2017 | Feng et al. |
| 2017/0234576 | A1 | 8/2017 | Kawagoe et al. |
| 2017/0292737 | A1 | 10/2017 | Moon |
| 2017/0354920 | A1 | 12/2017 | Switzer et al. |
| 2018/0043295 | A1 | 2/2018 | Friesen et al. |
| 2018/0171604 | A1 | 6/2018 | Kim et al. |
| 2018/0209123 | A1 | 7/2018 | Bahrami et al. |
| 2018/0261882 | A1 | 9/2018 | Chang et al. |
| 2019/0100903 | A1 | 4/2019 | Panda et al. |
| 2019/0234053 | A1 | 8/2019 | Kim et al. |
| 2019/0323714 | A1 | 10/2019 | Cui |
| 2020/0009497 | A1 | 1/2020 | Matuska et al. |
| 2020/0182734 | A1 | 6/2020 | Ueno et al. |
| 2020/0206679 | A1 | 7/2020 | Stuckenberg |
| 2020/0283997 | A1 | 9/2020 | Salloum et al. |
| 2020/0316514 | A1 | 10/2020 | Fuchs et al. |
| 2020/0363078 | A1 | 11/2020 | Mulet et al. |
| 2021/0062478 | A1 | 3/2021 | Friesen et al. |
| 2021/0156124 | A1 | 5/2021 | Yaghi et al. |
| 2021/0237535 | A1 | 8/2021 | Goel et al. |
| 2021/0283528 | A1 | 9/2021 | Pokorny et al. |
| 2021/0283574 | A1 | 9/2021 | Yaghi et al. |
| 2022/0001328 | A1 | 1/2022 | Yoon et al. |
| 2022/0106203 | A1 | 4/2022 | Marchon et al. |
| 2022/0170247 | A1 | 6/2022 | Yaghi et al. |
| 2022/0389691 | A1 | 12/2022 | Kuo et al. |
| 2023/0063572 | A1 | 3/2023 | Kapustin |
| 2023/0264138 | A1 | 8/2023 | McGrail et al. |

FOREIGN PATENT DOCUMENTS

| | | |
|---|---|---|
| CN | 106029674 A | 10/2016 |
| CN | 205718197 | 11/2016 |
| CN | 1077722290 A | 2/2018 |
| CN | 114182784 A | 3/2022 |
| CZ | 2018-337 | 7/2019 |
| EP | 0816225 A1 * | 1/1998 |
| EP | 2507247 A1 | 10/2012 |
| EP | 3721971 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | WO 2015/127033 A1 | 8/2015 |
| WO | WO2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 A1 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/162894 A1 | 8/2021 |
| WO | WO 2023/146800 A1 | 8/2023 |
| WO | WO 2023/181058 A1 | 9/2023 |

OTHER PUBLICATIONS

Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.
Global Cooling Prize. Transaera and partner Haier. Website, https://globalcoolingprize.org/transaera-inc/, originally downloaded Nov. 21, 2022, 3 pages.
PCT International Patent Application No. PCT/US23/33101, International Search Report and Written Opinion of the International Searching Authority dated Feb. 8, 2024, 16 pages.
United States U.S. Appl. No. 17/763,413, Office Action mailed Feb. 6, 2024.
United States U.S. Appl. No. 18/077,417, Office Action mailed Mar. 29, 2024.
United States U.S. Appl. No. 18/371,700, Office Action mailed Apr. 18, 2024.

(56) References Cited

OTHER PUBLICATIONS

Gleick. Water in Crisis: A Guide to the World's Fresh Water Resources. Chapter 2, pp. 13-24. Aug. 1993, Oxford University Press, New York, USA.
PCT International Patent Application No. PCT/US21/16261, International Search Report and Written Opinion of the International Searching Authority dated Apr. 16, 2021, 8 pages.
Furukawa et al. Water Adsorption in Porous Metal-Organic Frameworks and Related Materials. J. Am. Chem. Soc., Mar. 2014, 136, 11, 4369-4381.
Kalmutzki et al. Metal-Organic Frameworks for Water Harvesting from Air; Adv. Mater. Sep. 2018, 30(37) 1704304.
Kim et al. Water harvesting from air with metal-organic frameworks powered by natural sunlight. Science, Apr. 2017, 356:430-434.
Tu et al. Progress and Expectation of Atmospheric Water Harvesting. Joule, Aug. 2018, vol. 2, Issue 8(15), pp. 1452-1478.
PCT International Patent Application No. PCT/US23/33098, International Search Report and Written Opinion of the International Searching Authority dated Nov. 30, 2023, 11 pages.
U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.
PCT International Patent Application No. PCT/US19/63442, International Search Report and Written Opinion of the International Searching Authority dated Jan. 22, 2020, 7 pages.
PCT International Patent Application No. PCT/US20/14647, International Search Report and Written Opinion of the International Searching Authority dated May 5, 2020, 11 pages.
PCT International Patent Application No. PCT/US20/53052, International Search Report and Written Opinion of the International Searching Authority dated Jan. 4, 2021, 10 pages.
PCT International Patent Application No. PCT/US21/47491, International Search Report and Written Opinion of the International Searching Authority dated Dec. 7, 2021, 9 pages.
PCT International Patent Application No. PCT/US22/12990, International Search Report and Written Opinion of the International Searching Authority dated Apr. 7, 2021, 14 pages.
PCT International Patent Application No. PCT/US22/26153, International Search Report and Written Opinion of the International Searching Authority dated Jul. 28, 2022, 18 pages.
Ding et al. Carbon capture and conversion using metal-organic frameworks and MOF-based materials. Chem. Soc. Rev., May 2019, 48(2):2783-2828.
Fracaroli et al. Metal-Organic Frameworks with Precisely Designed Interior for Carbon Dioxide Capture in the Presence of Water. Am. Chem. Soc., Jun. 2014, 136, pp. 8863-8866.
Hanikel et al. Rapid Cycling and Exceptional Yield in a Metal-Organic Frameworks for Water Harvester. ACS Cent. Sci., Aug. 2019, 5(10):1699-1706.
Kummer et al. A functional full-scale heat exchanger coated with aluminum fumarate metal-organic framework for adsorption heat transformation. Ind. Eng. Chem. Res., Jul. 2017, 56(29):8393-8398.
Li et al. Incorporation of Alkylamine into Metal-Organic Frameworks through a Brønsted Acid-Base Reaction for $CO_2$ Capture. ChemSusChem., Oct. 2016, 9(19):2832-2840.
Zhou et al. Atmospheric Water Harvesting: A Review of Material and Structural Designs. ACS Materials Lett., May 2020, 2(7):671-684.
PCT International Patent Application No. PCT/US22/41142, International Search Report and Written Opinion of the International Searching Authority dated Jan. 20, 2023, 12 pages.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Fathieh et al. Practical water production from desert air. Sci. Adv., Jun. 2018, 4(6):eaat3198.
Klemm et al. Fog as a Fresh-Water Resource: Overview and Perspectives. Ambio, May 2012, 41(3):221-234.
Lee et al. Water harvest via dewing. Langmuir, Jun. 2012, 28(27):10183-10191.
Muselli et al. Dew water collector for potable water in Ajaccio (Corsica Island, France). Atmos. Res., Sep. 2002,64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Wahlgren. Atmospheric Water Vapour Processor Designs for Potable Water Production: A Review. Water Res., Jan. 2001, 35(1):1-22.
PCT International Patent Application No. PCT/IN23/50258, International Search Report and Written Opinion of the International Searching Authority dated Jul. 4, 2023, 10 pages.
Japanese Patent Application No. 2021-529709, Office Action dated Nov. 21, 2023, 6 pages.
U.S. Appl. No. 18/384,992, Office Action mailed Jan. 23, 2024.
U.S. Appl. No. 18/077,417, Office Action mailed Jan. 17, 2024.
European Patent Application No. 21754205.9, Extended European Search Report mailed Apr. 19, 2024. 8 pages.
Singapore Patent Application No. 11202252723Y, Office Action mailed Oct. 31, 2024, 8 pages.
European Patent Application No. EP 19891188.5, Office Action dated Jan. 26, 2024, 7 pages.
European Patent Application No. EP 19891188.5, Response to Office Action filed Apr. 9, 2024, 14 pages.
Lu et al. Tuning the structure and function of metal-organic frameworks via linker design. Chemical Society Reviews, Jan. 2014, 43(16):5561-5593.

\* cited by examiner

| Position | Mode | Step 1 | Step 2 | Step 3 | Step 4 | Step 5 | Step 6 |
|---|---|---|---|---|---|---|---|
| 1 | Adsorption | 3010 | 3060 | 3050 | 3040 | 3030 | 3020 |
| 2 | Adsorption | 3020 | 3010 | 3060 | 3050 | 3040 | 3030 |
| 3 | Adsorption | 3030 | 3020 | 3010 | 3060 | 3050 | 3040 |
| 4 | Adsorption | 3040 | 3030 | 3020 | 3010 | 3060 | 3050 |
| 5 | Adsorption | 3050 | 3040 | 3030 | 3020 | 3010 | 3060 |
| 6 | Desorption | 3060 | 3050 | 3040 | 3030 | 3020 | 3010 |

ATMOSPHERIC WATER HARVESTER WITH HIGH EFFICIENCY, AND METHODS OF USING THEREOF

CROSS-REFERENCE TO RELATED APPLICATION

This application is the United States National Stage of International Patent Cooperation Treaty Patent Application No. PCT/US2021/016261, filed Feb. 2, 2021, which claims the benefit of U.S. Provisional Patent Application No. 63/053,428, filed Jul. 17, 2020, and U.S. Provisional Patent Application No. 62/976,824, filed Feb. 14, 2020, each hereby incorporated by reference herein.

FIELD

The present disclosure relates generally to water harvesting, and more specifically to systems and methods for harvesting water from surrounding air using metal-organic-frameworks and/or other water capture materials.

BACKGROUND

A large percentage of the world's population is experiencing water shortages. The water in the form of vapor and droplets in the atmosphere is a natural resource that could be used to address the global water problem. Dewing from moist air and fog capture are examples of attempts to capture water from air, but such processes require either frequent presence of 100% relative humidity or a large amount of energy. Thus, such processes are not commercially viable solutions for capture of water from air. See generally Kim et al., Science 356, 430-434 (2017).

What is desired in the art are commercially viable systems and methods that can harvest water from surrounding air with minimum energy requirements and that can be powered by low-grade energy sources (e.g., sunlight).

BRIEF SUMMARY

In some aspects, provided is a water harvesting system for capturing water from surrounding air, comprising: an adsorption/desorption unit, at least one condenser, and at least one air-circulating unit. In some embodiments, the adsorption unit comprises a plurality of modules and a mode-shifting structure.

In some embodiments, the plurality of modules are configured such that at least one module operates in adsorption mode concurrently as at least one of the remaining modules operates in desorption mode, wherein each module comprises at least one structural element, wherein at least a portion of each structural element supports at least one water capture material, wherein the at least one water capture material adsorbs water from surrounding air when the module is in adsorption mode, and desorbs water in the form of water vapor when the module is in desorption mode.

In some embodiments, the mode-switching structure is configured to concurrently switch at least one module from adsorption mode to desorption mode and at least one module from desorption mode to adsorption mode. In some embodiments, the mode-switching structure comprises a rotating mechanism, wherein the plurality of modules are connected to the rotating mechanism and arranged in a rotary configuration.

In some embodiments, the at least one condenser is positioned in proximity to the at least one module in desorption mode, and configured to condense water vapor into liquid water.

In some embodiments, the at least one air-circulating unit is configured to draw surrounding air into each module in adsorption mode, thereby assisting adsorption of water by the at least one water capture material from the surrounding air.

In some aspects, provided is a water harvesting system for capturing water from surrounding air, comprising: an adsorption/desorption unit, at least one condenser, and at least one air-circulating unit.

In some variations, the adsorption/desorption unit comprises at least one structural element, wherein at least a portion of each structural element supports at least one water capture material, wherein the at least one water capture material adsorbs water from surrounding air when in adsorption mode, and desorbs water in the form of water vapor when in desorption mode. In some embodiments, the at least one structural element is a conductive element, and the conductive element is resistively heated by flowing electricity to facilitate desorption of water from the water capture material coated on the conductive element.

In some embodiments, the at least one condenser is positioned in proximity to the at least one structural element, and configured to condense water vapor into liquid water.

In some embodiments, the at least one air-circulating unit is configured to simultaneously (i) draw surrounding air into the at least one module operating in adsorption mode, thereby assisting adsorption of water by the at least one water capture material in the module from the surrounding air, and (ii) circulate air to cool the at least one condenser.

In some aspect, provided is a water harvesting system for capturing water from surrounding air, comprising an adsorption/desorption unit, at least one condenser, and at least one air-circulating unit. In some embodiments, the adsorption/desorption unit comprises a plurality of modules arranged in a rotary configuration, and a rotating mechanism.

In some embodiments, each module comprises at least one conductive element, wherein at least a portion of each conductive element is coated with at least one water capture material, wherein the at least one water capture material adsorbs water from surrounding air when the module is in adsorption mode, and desorbs water in the form of water vapor when the module is in desorption mode.

In some embodiments, the plurality of modules are mounted onto the rotating mechanism, and configured to concurrently switch at least one module from adsorption mode to desorption mode and at least one module from desorption mode to adsorption mode.

In some embodiments, the at least one condenser is positioned in proximity to the at least one module in desorption mode, and configured to condense water vapor into liquid water.

In some embodiments, the at least one air-circulating unit is configured to draw surrounding air into each module in adsorption mode and circulate the air in the adsorption/desorption unit, thereby assisting adsorption of water by the at least one water capture material from the surrounding air.

DESCRIPTION OF THE FIGURES

The present application can be best understood by reference to the following description taken in conjunction with the accompanying figures included in the specification. The figures herein are not drawn to scale.

FIG. 8A depicts an increase in the weight of the module in adsorption mode. FIG. 8B depicts a decrease in the weight of the module in desorption mode. FIG. 8C depicts weight changes of a module during multiple adsorption/desorption cycles.

DETAILED DESCRIPTION

Figure 1:
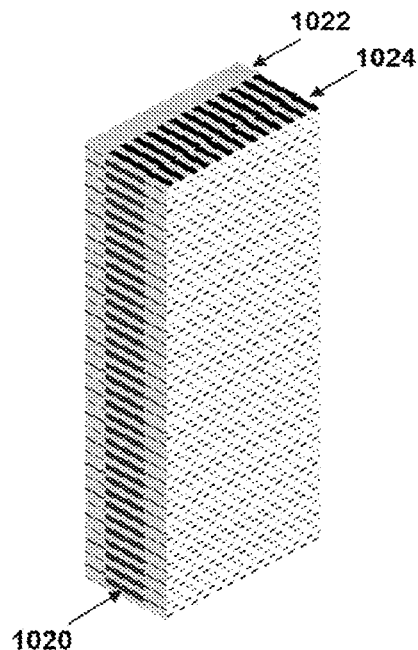
FIG. 1 depicts an exemplary plate-like structural element coated with water capture material.

The following description sets forth exemplary methods, parameters and the like. It should be recognized, however, that such description is not intended as a limitation on the scope of the present disclosure but is instead provided as a description of exemplary embodiments.

In some aspects, provided herein are water harvesting systems for capturing water from surrounding air. In some embodiments, the systems include at least an adsorption/desorption unit, at least one condenser, and at least one air-circulating unit. The adsorption/desorption unit has a plurality of modules that contain water capture material. When the system is operating in steady state, at least one of the modules is in adsorption mode, and simultaneously, at least one of the remaining modules is in desorption mode. In adsorption mode, water capture material in a given module adsorbs water from surrounding air. The air-circulating unit draws surrounding air into each module in adsorption mode, thereby assisting adsorption of water by the water capture material from the surrounding air. Then, when the module switches into desorption mode, the module desorbs water in the form of water vapor or steam.

In certain aspects, the systems provided herein further include a mode-switching structure that switches at least one module from adsorption mode to desorption mode, and at least one of the remaining modules from desorption mode to adsorption mode. In some variations, the mode-switching structure is a rotary structure on which the plurality of modules are mounted onto. The rotary structure rotates to shift at least one module from adsorption mode to desorption mode, and at least one of the remaining modules from desorption mode to adsorption mode.

Once water is desorbed from a given module in desorption mode, the water vapor is condensed into liquid water via at least one condenser positioned in proximity to the at least one module in desorption mode. The liquid water can then be collected by a storage tank. In some variations, the systems described herein further include at least one steam-redirecting unit that redirects water vapor desorbed from a given module in desorption mode to the condenser.

In other aspects, provided herein are also water harvesting systems for capturing water from surrounding air, comprising: an adsorption/desorption unit, at least one condenser, and at least one air-circulating unit that simultaneously (i) draws surrounding air into the at least one module operating in adsorption mode, thereby assisting adsorption of water by the at least one water capture material in the module from the surrounding air, and (ii) circulates air to cool the at least one condenser. Effectively, the surrounding air drawn in by the air-circulating unit could be recirculated or recycled to achieve at least two different purposes: adsorbing water and cooling the condenser.

The water harvesting systems described herein increase the efficiency and simplicity of water harvesting. In some aspects, the time for each adsorption/desorption cycle can be shortened. In some embodiments, a compressor becomes unnecessary, making the operation less noisy and less expensive. In other aspects, simultaneous adsorption/desorption enables more efficient design of the water harvesting systems. In some variations, the systems described herein do not require a compressor or a separate cooling mechanism, a gate valve, a chamber, or a vacuum plump.

In other aspects, provided herein are also methods of capturing water from surrounding air using the systems provided herein. In some embodiments, the methods comprise: adsorbing water from surrounding air in at least one module in adsorption mode; desorbing at least a portion of water in at least one of the remaining modules in desorption mode; condensing at least a portion of the water vapor release from the at least one module in desorption mode using die at least one condenser to produce liquid water, wherein adsorbing, desorbing, and condensing occur concurrently; and switching at least one module in adsorption mode to desorption mode and at least one of the remaining modules in desorption mode to adsorption mode.

In some embodiments, the methods comprise: drawing surrounding air into at least one module in adsorption mode to assist adsorption of water by the at least one water capture material and to assist cooling of the at least one condenser, wherein the air is recirculated or recycled to assist both adsorption and cooling, heating at least one of the remaining modules in desorption mode to assist desorption of at least a portion of water from the at least one water capture material, and condensing at least a portion of the water vapor release from the at least one module in desorption mode using the at least one condenser to produce liquid water.

In some embodiments, the methods comprise: adsorbing water from surrounding air in at least one module in adsorption mode, desorbing at least a portion of water in at least one of the remaining modules in desorption mode, condensing at least a portion of the water vapor release from the at least one module in desorption mode using the at least one condenser to produce liquid water, wherein adsorbing, desorbing, and condensing occur concurrently; and rotating at least one module in adsorption mode to desorption mode and at least one of the remaining modules in desorption mode to adsorption mode.

The systems, and methods of using such systems for water harvesting, are described in further detail below.

Adsorption/Desorption Unit

In some embodiments, water harvesting systems for capturing water from surrounding air comprises an adsorption/desorption unit. In some embodiments, the adsorption/desorption unit comprises a plurality of modules and a mode-switching structure.

a) Modules

In some embodiments, the plurality of modules are configured such that at least one module operates in adsorption mode concurrently as at least one of the remaining modules operates in desorption mode. In some embodiments, the plurality of modules are arranged in a rotary configuration. In some embodiments, the plurality of modules are connected to or mounted on a rotating base.

In some embodiments, each module comprises at least one structural element. With reference to FIG. 1, exemplary plate-like structural element 1020 is coated by adsorbing layers 1022 and 1024. Structural element 1020 supports water capture material coated on both sides of the structural element, where the structural element is a heating substrate that can be heated, e.g., by flowing electricity. It should be understood that, in certain variations, each adsorbing layer may have the same or different water capture material. In other variations, each adsorbing layer may have the same or different thickness. In yet other variations, only one side of the structural element is coated by an adsorbing layer.

In some embodiments, the adsorption/desorption unit is configured to directly heat the at least one structural element, which may minimize waste heat. In some embodiments, the at least one structural element is a conductive element. In some embodiments, the conductive element is resistively heated by flowing electricity to the conductive element. In some embodiments, the conductive element is a metal or a metal plate.

Figure 6:
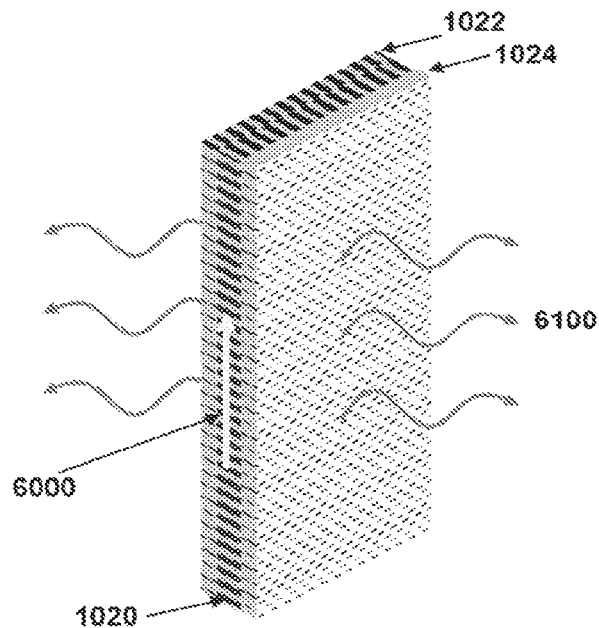
FIG. 6 depicts an exemplary plate-like structural element coated with water capture material undergoing desorption.

With reference to FIG. 6, structural element 1020 is a conductive element (or resistive substrate). During desorption, structural element 1020 is resistively heated by flowing electricity 6000 through it, thereby assisting desorption of water, in the form of steam 6100, from adsorbing layers 1022 and 1024, made up of water capture material, coated on conductive element 1020.

Figure 2A:
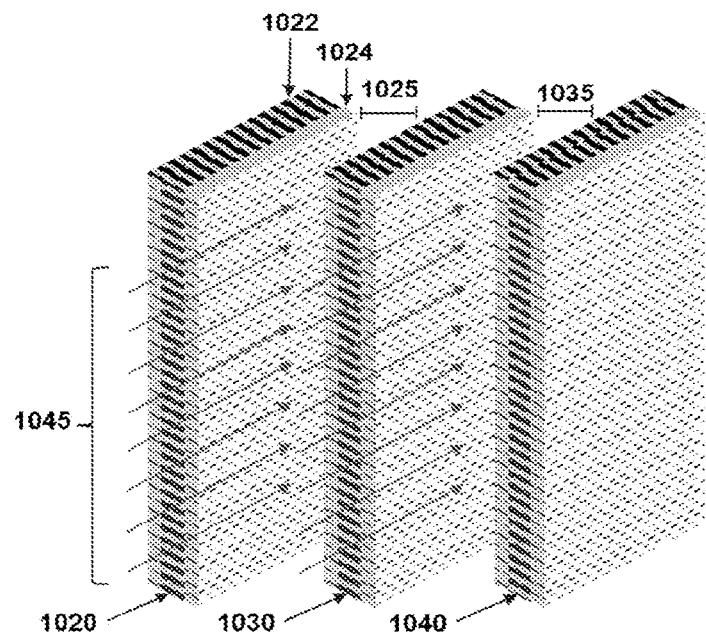
FIGS. 2A and 2B depict air flow through a plurality of exemplary structural elements coated with water capture material.
Figure 2B:
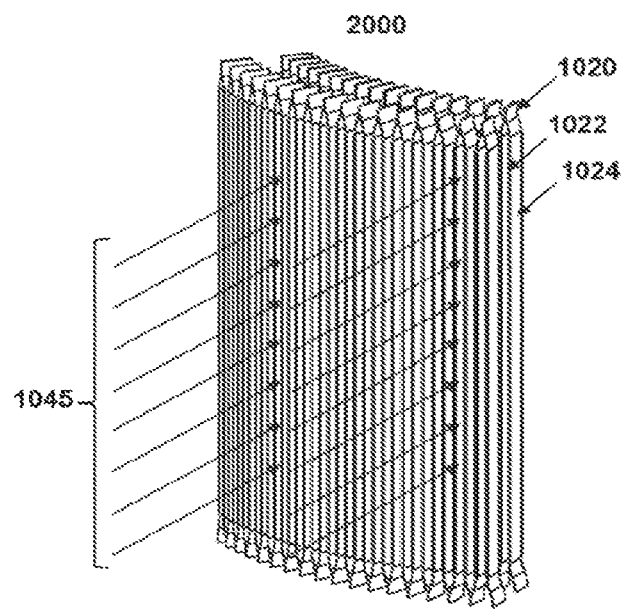

With reference to FIGS. 2A and 2B, air flow is depicted flowing into an adsorption/desorption unit, through the gaps between adjacent structural elements. During adsorption, surrounding air flows through the gaps of adjacent structural elements, allowing the adsorbing layers to adsorb water from surrounding air. FIG. 2A depicts a plurality of exemplary plate-like structural elements 1020, 1030 and 1040 arranged in parallel, with gaps (1025 and 1035) between adjacent structural elements (1020 and 1030, and 1030 and 1040, respectively) with air (represented by set of arrows 1045) flowing in between the gaps. FIG. 2B depicts a plurality of exemplary plate-like structural elements (2000) arranged radially, with gaps between adjacent structural elements and air (represented by set of arrows 1045) flowing in between the gaps. As depicted in this figure, each structural element is a heating substrate coated on both sides with adsorbing layers. For example, structural element 1020 is coated on both sides with adsorbing layers 1022 and 1024. It should be understood that, in certain variations, each adsorbing layer may have the same or different water capture material. In other variations, each adsorbing layer may have the same or different thickness. In yet other variations, only one side of the structural element is coated by an adsorbing layer.

In some embodiments, electrical power applied to the conductive element can be tailored to optimize desorption time, as the rate of water desorption dm/dt is related to the electrical power W by the following equation, with $E_{ads}$ being the heat of adsorption of water into the water capture material or the MOF layer:

$$\frac{dm}{dt} = \frac{w}{\varepsilon_{ads}} \qquad \text{Equation (1)}$$

The electrical resistance of the substrate R, as well as the current I flowing through it can therefore be tuned for optimum desorption rate, since the power W is related to R and 1 through the following equation:

$$W = RI^2 \qquad \text{Equation (2)}$$

Figure 10:
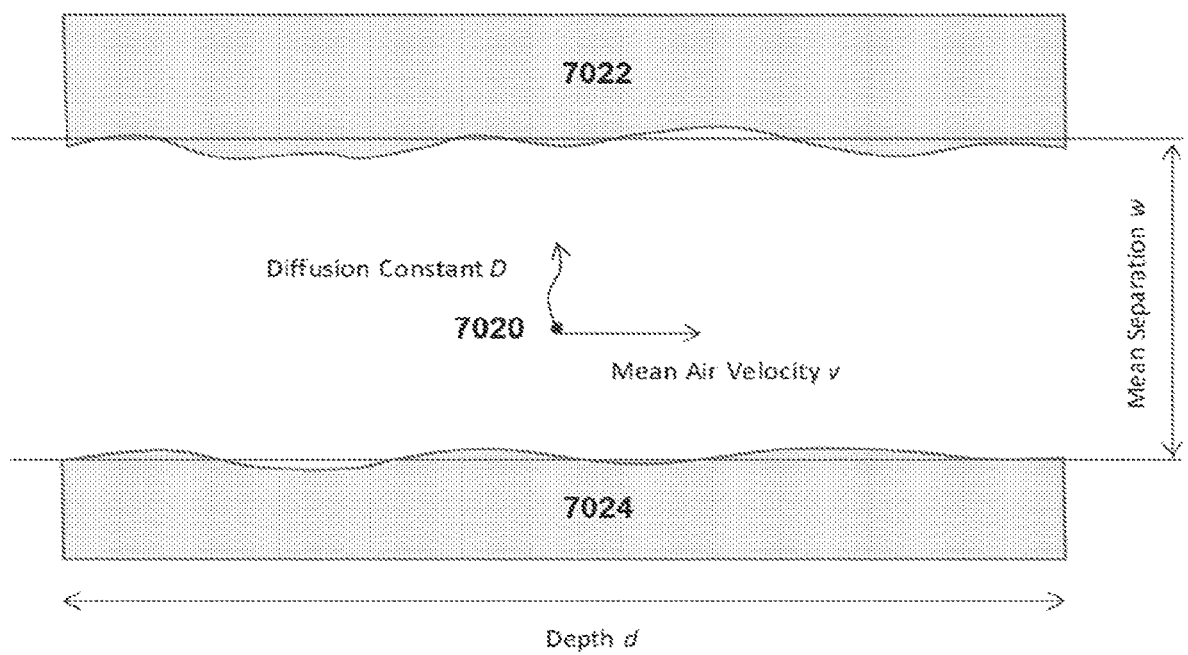
FIG. 10 depicts an exemplary schematic of parameters considered in designing and arranging structural elements to allow for diffusion of water from surrounding air to a water capture material. This drawing is not to scale.

In some embodiments, the structural elements are designed and arranged to allow for diffusion of water from surrounding air to the water capture material during the adsorption phase. With reference to FIG. 10, layers 7022 and 7024 of water capture material are coated on adjacent structural elements, and exemplary air molecule 7020 is shown as a dot passing through the gap between those structural elements. In some embodiments, with reference again to FIG. 10, the structural elements are designed and arranged in a way such that $d/v > c \times (w/2)^2/D$, where (i) d is the depth of travel by air (excluding water vapor) through the gap between the structural elements during the adsorption phase, (iii v is the mean velocity of air (carrying water vapor) through the structural elements during the adsorption phase, (iii) c is a constant, (iv) w is the mean separation between water capture material layers 7022 and 7024 on adjacent structural elements, and (v) D is the diffusion constant or diffusivity of water vapor.

In $d/v > c \times (w/2)^2/D$, the left side of the inequality notation, i.e., d/v, may be referred to as the "transit time" and denoted as $t_{Trans}$. The right side of the inequality notation without the constant c, i.e., $(w/2)^2/D$, may be referred to as the "diffusion time" and denoted as $t_{Diff}$. The condition $d/v > c \times (w/2)^2/D$ can be equivalently written as $t_{Trans} > c \times t_{Diff}$, or stated as that the transit time of air molecules is greater than a certain percentage of the diffusion time of water vapor. For example, if c is 0.30%, the structural elements are arranged such that the transit time is greater than 30% of the diffusion time.

In some variations, the constant c is at least about 5%, at least about 10%, at least about 30%, at least about 50%, or at least about 75%; or between about 1% and about 5%, between about 5% and 50%, between about 10% and about 50%, between about 30% and about 75%, or between about 50% and 150%.

Figure 3A:
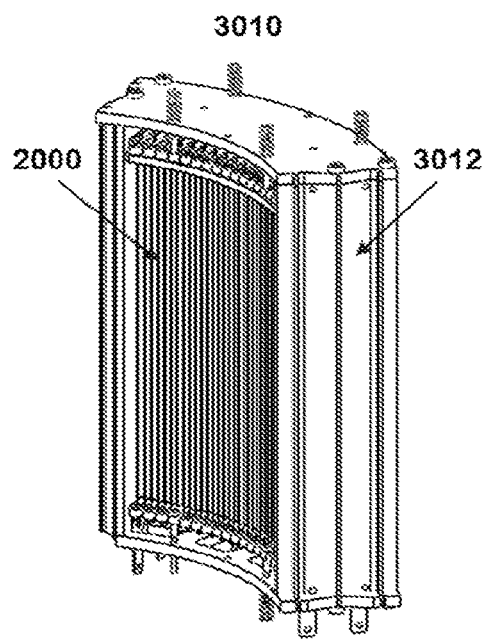
FIG. 3A depicts an exemplary module containing a plurality of structural elements coated with water capture material held together by a frame.

In some embodiment, the structural elements are arranged radially, in series, or in parallel, to form a module. In some embodiments, the structural elements are welded together, soldered together, held in compression together, or electrically connected by any other means. With reference to FIG. 3A, example module 34110 includes a plurality of plate-like structural elements 20 coated with water capture material and arranged radially, held together by frame 3012.

In some embodiments, the structural elements are flexible. In some embodiments, the structural elements are held in tension, in order to maintain even spacing and preventing the elements from contacting one another. In some embodiments, the tensioning mechanism is a whiffle tree or whippletree. In some embodiments, the whippletree is formed by one or more flexible members.

Figure 3B:
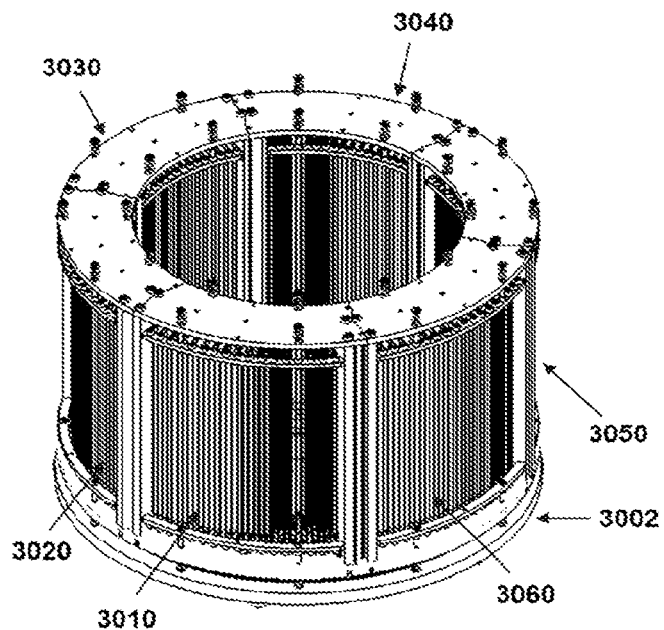
FIGS. 3B and 3C (exploded view) depict an exemplary adsorption/desorption unit made up six modules arranged in a rotary configuration and mounted onto a rotating base (rotary carousel).
Figure 3C:
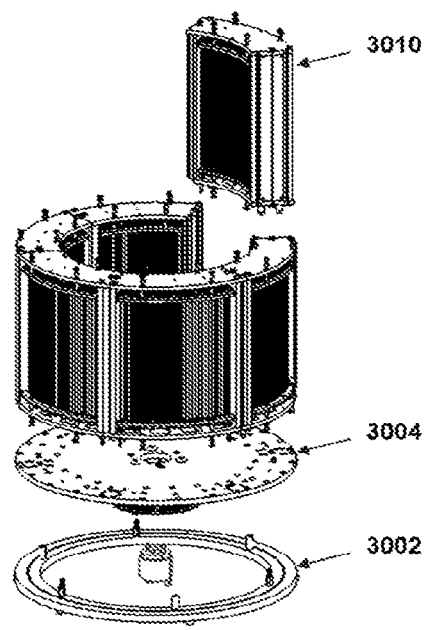

In some embodiments, the plurality of modules are configured in such a way as to form a cylinder. With reference to FIGS. 3B and 3C, exemplary adsorption/desorption unit 3000 includes six modules (3010, 3020, 3030, 3040, 3050, and 3060) arranged in a rotary configuration and mounted onto mode-switching structure 3002 (FIG. 3B). The mode-switching structure depicted here is a rotary carousel. As depicted in the exploded view of FIG. 3C, mode-switching structure 3002 includes rotating base 3004. While six modules are depicted in the exemplary adsorption/desorption unit of FIGS. 3B and 3C, it should be understood that, in other variations, the adsorption/desorption unit may include any number of modules within the plurality of modules.

In some embodiments, the modules are rotated in such a way that one or more of the modules are moved into an area of desorption and one or more of the modules are moved into an area of adsorption. In some embodiments, the rotation of the modules is performed by a rotating plate driven by a motor through a belt. In some embodiments, the rotation of the modules is performed by a rotating plate driven by a motor through a system of one or more gears.

In some embodiments, the at least one structural element is at least one plate. In some embodiments, the at least one plates are arranged radially or parallel to each other within the module. In some embodiments, the at least one plates are each independently coated on one or both sides with the water capture material.

In some variations, the plates are arranged radially or parallel to each other and a gap exists between adjacent plates. The plates may be made of any suitable material, including any suitable metal. For example, in some variations, the plates comprise aluminum. In some variations, the plates comprise solid metal. In one variation, the plates are in the shape of fins.

In certain variations, the plates have a flat surface. In other variations, each plate has a cellular design where its surface is crisscrossed with small channels in a grid pattern, so as to make water capture material areas (e.g., squares) that would allow for thermal expansion mismatch between the plates and the water capture material. In other variations, each plate has a surface textured with topographic features that can enhance water adsorption/desorption performance and/or reliability. In one variation, the topographic features are holes, bumps, ridges, or grooves, or any combination thereof. In another variation, the plates include mesh. For example, in one variation, the plates include aluminum mesh.

In some embodiments, the distance of the gap between adjacent plates relative to the length of each plate achieves optimal air flow and maximizes water adsorption. In some variations the gap between adjacent plates is about 1% to about 5% of the length of a plate.

In some embodiments, the plates are coated with layers of the water capture material each having a thickness between about 10 microns to about 500 microns, or between about 50 microns to 500 microns, or between about 10 microns to about 50 microns. The thickness of the layer may allow for faster adsorption and desorption (e.g., as compared to thicker layers). In other embodiments, the plates are coated with layers of the water capture material each having a thickness of about 0.1 to about 1 cm. Such thickness of the layer may allow for production of larger water quantities (e.g., as compared to thinner layers).

In certain embodiments, each layer of the water capture material on the plates has a porosity. In some variations, the porosity is at least about 40%, at least about 50%, at least about 60%, at least about 70%, or at least about 80%; or between about 40% and about 90%, between about 50% and 90%, between about 40% and about 80%, between about 50% and about 80%, or between about 60% and about 80%. In other embodiments, the layer of the water capture material is non-porous.

In some embodiments, the ratio of the thickness of the layer of the water capture material is greater than the thickness of a plate. In certain embodiments where both sides of the plates are coated with the water capture material, the ratio of the thickness of the first (e.g., top) layer of the water capture material to the thickness of the plate to the thickness of the second (e.g., bottom) layer of the water capture material optimizes desorption of water and energy used to heat the plates in the chamber. In some variations, where the layers are non-porous, the thickness of each layer of the water capture material may be at least greater than half of the plate thickness.

In some variations of the foregoing, the layers of the water capture material may be mixed with one or more additional components. In some variations, a binder may be mixed into the layer. In certain variations, an organic binder may be used. In certain variations, silicone binder may be used. In one variation, a silicone resin binder may be used. In certain variations, the layer may further comprise one or more materials to help with thermal conductivity, to speed up transfer. In one variation, the layer further comprises graphite.

In certain variations, the water capture material is uniformly distributed on the plates. Any suitable techniques known in the art may be employed to coat the layers of the water capture material on the plates. For example, in one variation, the layers of water capture material are deposited onto the plates.

b) Water Capture Material

In some embodiments, at least a portion of each structural element supports at least one water capture material. In some embodiments, at least a portion of each structural element is coated with at least one water capture material. In some embodiments, at least one water capture material adsorbs water from surrounding air when the module is in adsorption mode, and desorbs water in the form of water vapor when the module is in desorption mode.

In some variations, the water capture material comprises metal-organic frameworks (MOFs). MOFs are porous materials that have repeating secondary building units (SBUs) connected to organic ligands. In some variations, the SBUs may include one or more metals or metal-containing complexes. In other variations, the organic ligands have acid and/or amine functional group(s). In certain variations, the organic ligands have carboxylic acid groups.

Any suitable MOFs capable of adsorbing and desorbing water may be employed in the systems provided herein. In one variation, MOF-303 may be used, which has a structure of Al(OH)(HPDC), where HPDC stands for 1H-pyrazole-3,5-dicarboxylate (which may also be referred to as 3,5-PyzDC). Other suitable MOFs may include, for example, CAU-10, MIL-53, MOF-801, MOF-841 and MIL-160. See e.g., Kalmutzki et al., Adv. Mat., 30(37), 1704304 (2018);

Furukawa et al., J. Am. Chem. Soc. 2014, 136, 4369-4381. A combination of MOFs may also be used.

In some variations, the MOFs have pore sizes between about 0.5 nm about 1 nm, or between about 0.7 nm to about 0.9 nm. In certain variations, the MOFs have a hydrophilic pore structure. In certain variations, the MOFs have a hydrophilic pore structure comprising acid and/or amine functional groups. In certain variations, the MOFs have 1 D channels that allow for reversible water adsorption.

In some variations, the water capture material is a microporous Aluminum Phosphate (AlPO4-LTA). See e.g. Y. Tu et al, Joule, Vol 2, Issue 8015), 1452-1475 (2018)

In other variations, the water capture material is a desiccant material. Any suitable desiccant material may be used.

Any combinations of the water capture materials described herein may also be used.

In some embodiments, the water capture material is mixed with a binder to improve its properties for adhesion to a substrate.

c) Mode-Switching Structure

In some embodiments, the mode-switching structure is configured to switch at least one module from adsorption mode to desorption mode and at least one module from desorption mode to adsorption mode. In some embodiments, the mode-switching structure comprises a rotating mechanism, wherein the plurality of modules are connected to the rotating mechanism and arranged in a rotary configuration.

In certain variations, the system comprises: an adsorption/desorption unit, that has a plurality of modules containing at least one water capture material, arranged in a rotary configuration; a rotating mechanism, wherein the plurality of modules are mounted onto the rotating mechanism, and configured to switch at least one module from adsorption mode to desorption mode and at least one module from desorption mode to adsorption mode, at least one condenser, positioned in proximity to the at least one module in desorption mode, and configured to condense water vapor into liquid water; and at least one air-circulating unit, configured to draw surrounding air into each module in adsorption mode and circulate the air in the adsorption/desorption unit, thereby assisting adsorption of water by the at least one water capture material from the surrounding air. In one variation of the foregoing, the at least one condenser is positioned in the interior of the plurality of modules arranged in a rotary configuration. In one variation of the foregoing, the air drawn from surrounding air is recirculated or recycled to achieve mom than one purpose, e.g., adsorbing water and cooling the condenser.

Figure 5A:
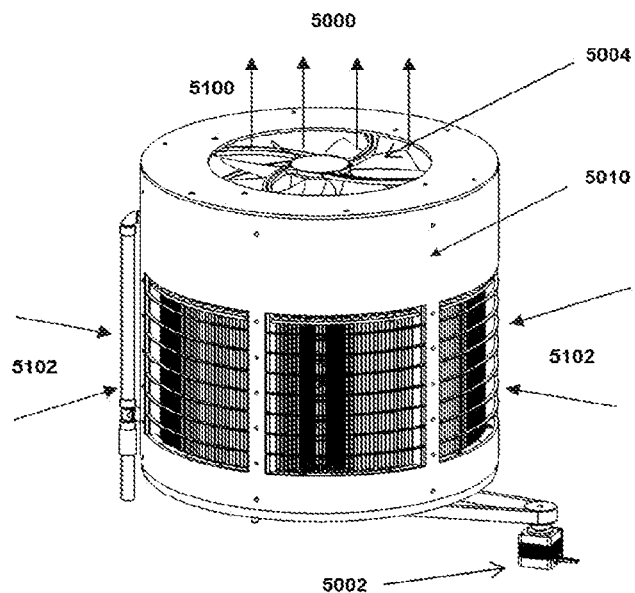
FIGS. 5A and 5B depict an exemplary water harvesting system with a rotary structure or carousel.
Figure 5B:
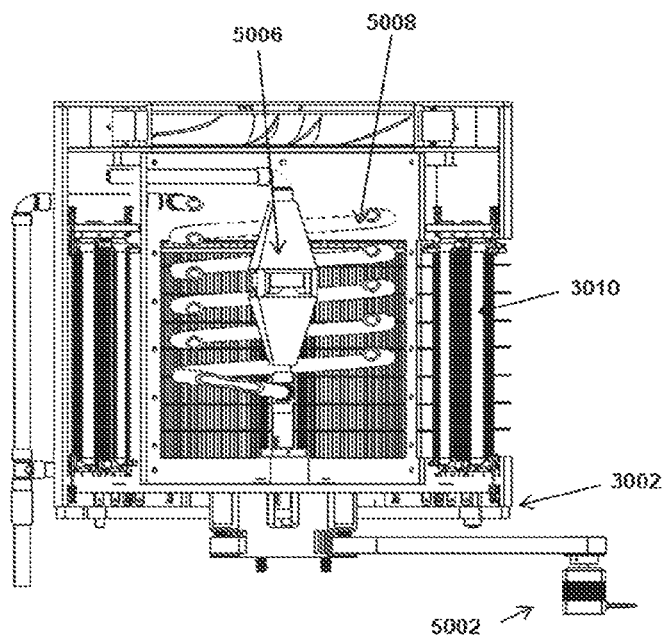

With reference to FIGS. 5A and 5B, depicted are two views of exemplary water harvesting system 5000 with a rotary mode-switching structure or a carousel and housing unit 5010. Air-circulating device 5004 (a fan as depicted in FIG. 5A) draws surrounding air 5102 from the side of carousel, letting the air flow through module 3010 in adsorption mode and through condenser 5008 (the condensation coil in FIG. 5B), wrapped around steam-redirecting device 5006 (a condensation fan in this example) and blowing air 5100 out at the top of carousel. The cross-sectional view in FIG. 5B depicts carousel 3002 including carousel motor 5002.

Sealing Structure

In some embodiments, the water harvesting system further includes a sealing structure, configured to seal one or more modules in desorption mode. In some embodiments, the sealing structure fully or partially isolates one or more modules in desorption mode from one or more modules in adsorption mode. In some embodiments, the sealing structure is within each module. In some embodiments, the sealing structure is external to each module. In some embodiments, the sealing structure is partly within each module and partly external to each module.

In some embodiments, structural elements coated with water capture material are enclosed in a frame to form a module. In some embodiments, the frame or the enclosure is partly or fully sealed during desorption and open during adsorption.

Condenser

In some embodiments, the water harvesting system further includes at least one condenser. In some embodiments, the condenser is positioned in proximity to the at least one module in desorption mode, and configured to condense water vapor into liquid water.

In some embodiments, the at least one condenser is positioned in the interior of the plurality of modules arranged in a rotary configuration.

In certain embodiments, the water harvesting system includes one or more condensers. The condenser is positioned in proximity to one or more of the modules. In some variations, multiple condensers are used. In one variation where multiple condensers are used, the condensers arranged serially or in parallel.

In some embodiments, the condenser is a tubing. In some embodiments, water vapor is condensed inside the tubing. In some embodiments, the tubing has coil structure or is a coil of tubing. In some embodiments, the tubing is cooled by circulating or blowing air around the exterior of the condenser. In some embodiments, the air circulated around or blown to the exterior of the condenser is the air used for adsorption. In some embodiments, the air circulated around or blown to the exterior of the condenser is the air cooled with cold storage. In some embodiments, the condenser is cooled with the cold side of a refrigeration cycle. In some embodiments, the condenser is an active chiller, e.g., based on refrigeration cycle or cold storage.

Figure 5C:
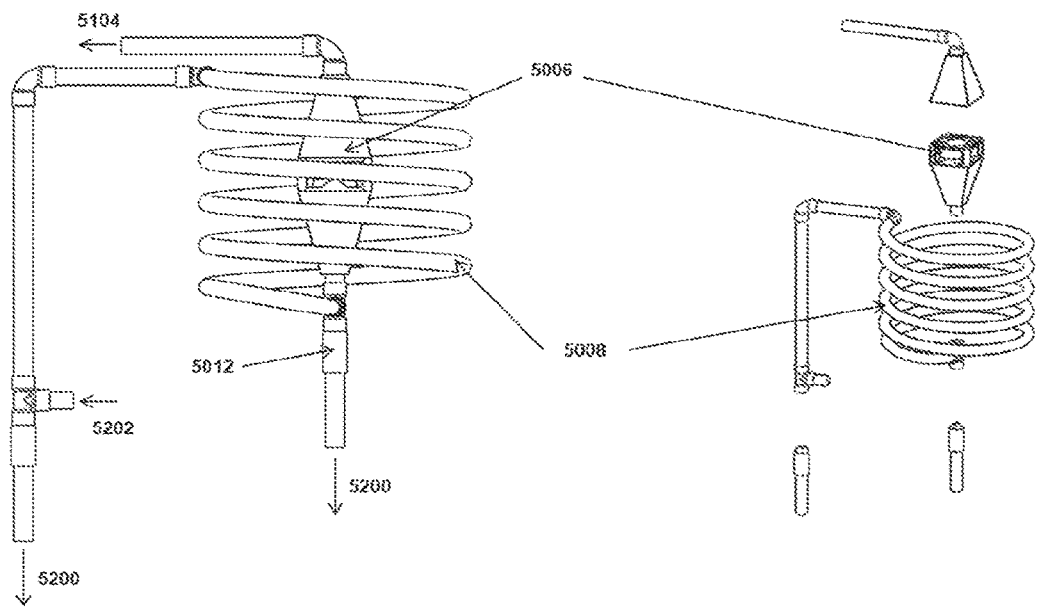
FIGS. 5C and 5D depict exemplary circulating ambient temperature condensers, with an exploded view of the setup on the right side of each figure.

With reference to FIG. 5C, exemplary condenser 5008 is a condensation coil, wrapped around steam-redirecting device 5006 (a condensation fan in this example). Steam-redirecting device 5006 redirects or sucks water vapor or steam 5202 generated in the modules in desorption mode into condenser 5008 (the condensation coil in this example) to condense water vapor into liquid water.

Figure 5D:
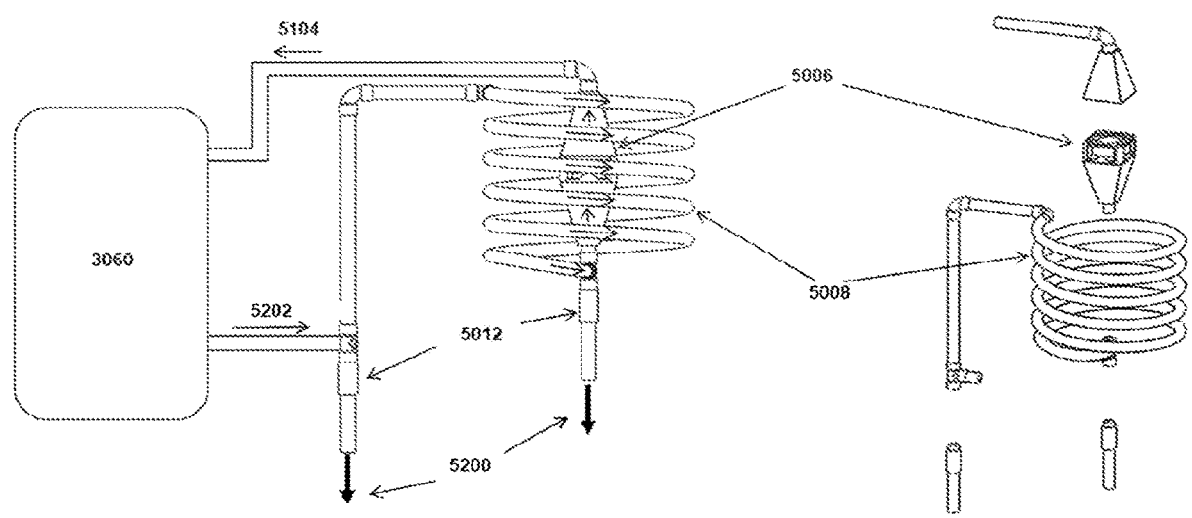

With reference to FIG. 5D, after condensation, water 5200 is directed (e.g., by gravity) into float valve 5012 that allows its collection. The condensation air stream 5104 is subsequently recirculated into the module 3060 in desorption mode in order to minimize the loss of moisture and energy into the ambient air.

Air-Circulating Unit

In some embodiments, the water harvesting system comprises at least one air-circulating unit. In some embodiments, the air-circulating unit is configured to draw surrounding air into each module in adsorption mode, thereby assisting adsorption of water by the at least one water capture material from the surrounding air.

In some embodiments, the at least one air-circulating unit is configured to simultaneously (i) draw surrounding air into the at least one module operating in adsorption mode, thereby assisting adsorption of water by the at least one water capture material in the module from the surrounding air, and (ii) circulate air to cool the at least one condenser.

Steam-Redirecting Unit

In some embodiments, the water harvesting system comprises at least one steam-redirecting unit. In some embodiments, the steam-redirecting unit is configured to redirect water vapor desorbed from the at least one module in desorption mode to the at least one condenser. In certain variations, the steam-redirecting unit is a fan or a positive displacement pump.

Condenser Recirculating Air Stream

In some embodiments, the water harvesting system comprises at least one recirculating unit. In some embodiments, the recirculating unit is configured to recycle the air stream exiting the condensing coil to the at least one desorption module.

Water Collection Unit

In some embodiments, the water harvesting system comprises at least one float valve, configured to collect the condensed liquid water by gravity without any loss of air, or any substantial loss of air.

In some embodiments, the water harvesting system comprises at least one collection unit, configured to receive the liquid water. In some embodiments, the water harvesting system comprises at least one collection unit, configured to receive the liquid water exiting the at least one condenser through the at least one float valve. In some variations, the water collection unit is a storage tank.

Control System

In some embodiments, the water harvesting system includes a control system configured to monitor and control adsorption, desorption, and condensation. In some embodiments, the control system includes one or more sensors and one or more processor units.

In some embodiments, the control system is used to increase or decrease the amount of power delivered to the modules to speed up or slow down the rate of desorption. In some embodiments, the control system is used to increase or decrease the rate at which water vapor is removed from the desorption area or modules in desorption mode and/or the rate which air is pushed into the desorption area or modules in desorption mode. In some embodiments, the control system is used to increase or decrease the amount of time that the modules spend in desorption mode. In some embodiments, the control system is used to increase or decrease the amount of time that the modules spend in the adsorption mode. In some embodiments, the control system is used to increase or decrease the rate at which air is moved across the modules during adsorption.

In some embodiments, the control system monitors and controls the water harvesting system based on environmental conditions such as temperature and humidity. In some embodiments, temperature or humidity sensors are placed inside or near the adsorption modules (modules in adsorption mode) and the desorption modules (modules in desorption mode).

In some embodiments, the control system monitors and controls the water harvesting system to maximize the total water captured over multiple adsorption and desorption cycles, as opposed to optimizing the adsorption or desorption amounts individually.

In some embodiments, a control system can be designed so that the time step for the rotation of the modules or the adsorption/desorption unit can be adjusted in such a way that (i) the time each module spends in adsorption mode before it switches to desorption mode (total adsorption time) is just enough to mostly saturate the water capture material in that module with water and (ii) the time each module spends in desorption mode before it switches to adsorption mode (total desorption time) is just enough to desorb most of the water captured by the water capture material in that module.

In some embodiments, the control system controls the speed of the steam-redirecting unit and the amount of power provided to heat the structural elements, to either speed up or slow down the desorption to match adsorption rate. Similarly, the speed of the air-circulating unit may be increased or decreased to speed up or slow down the adsorption rate to match the desorption rate. This control may be important as different temperature and humidity levels will affect the amount of the time needed for adsorption and desorption.

Power Sources

In some variations, the systems provided herein further include one or more solar power source(s). In certain variations, the systems further include photovoltaic (PV) cells or passive solar captors, or a combination thereof.

EXAMPLES

The following Examples are merely illustrative and are not meant to limit any aspects of the present disclosure in any way.

Example 1

A Water Harvesting System to Produce Drinking Water

Water Harvesting System

A MOF layer paste, consisting of MOF powder (MOF-303 in this example) mixed with 5-15% of an organic binder, was deposited as a thin film on an electrically conductive substrate (conductive element). After curing, the MOF layer was intimately bound to the substrate, with great mechanical and thermal properties. A series of these substrates coated with MOF layer were electrically connected and assembled into modules. A small gap between the substrates allowed air to flow.

Figures 4A, 4B:
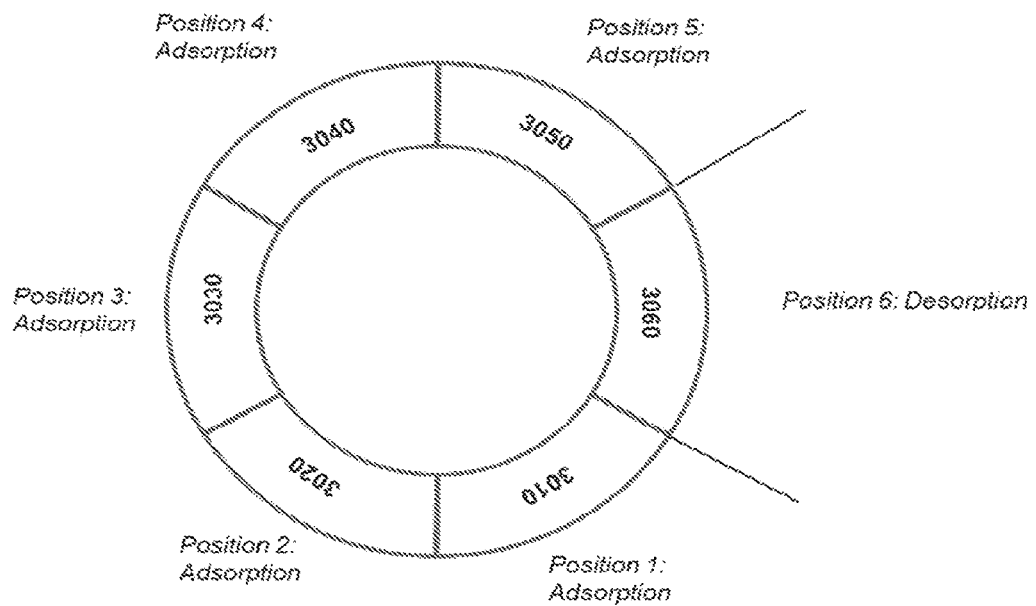
FIG. 4A depicts an exemplary arrangement of modules in a rotary configuration. In this figure, modules 1-5 are in adsorption mode, and module 6 is in desorption mode.
FIG. 4B depicts a table showing the mode of each module in each exemplary step. For example, module 2-6 are in adsorption mode and module 1 is in desorption mode in step 6.

Modules were assembled in a rotary structure, called a carousel (FIGS. 3A and 3B). The carousel was constructed in such a way that one or more modules are in adsorption mode, while the other modules are in desorption mode. In this example, the carousel was composed of a total of six modules, with five modules in adsorption mode and one module in desorption mode (FIG. 4A). As the carousel rotated, modules moved from Position N to Position N+1, starting in adsorption mode, and eventually entering desorption mode (FIG. 4B).

In the modules in adsorption mode, air was sucked through the center of the structure using a central fan, and was forced between the MOF layer substrates, allowing moisture to be captured by the MOF layers (FIGS. 5A and 5B). When the module entered desorption mode, a current was passed into the substrates, heating them up (FIG. 6).

Figure 7:
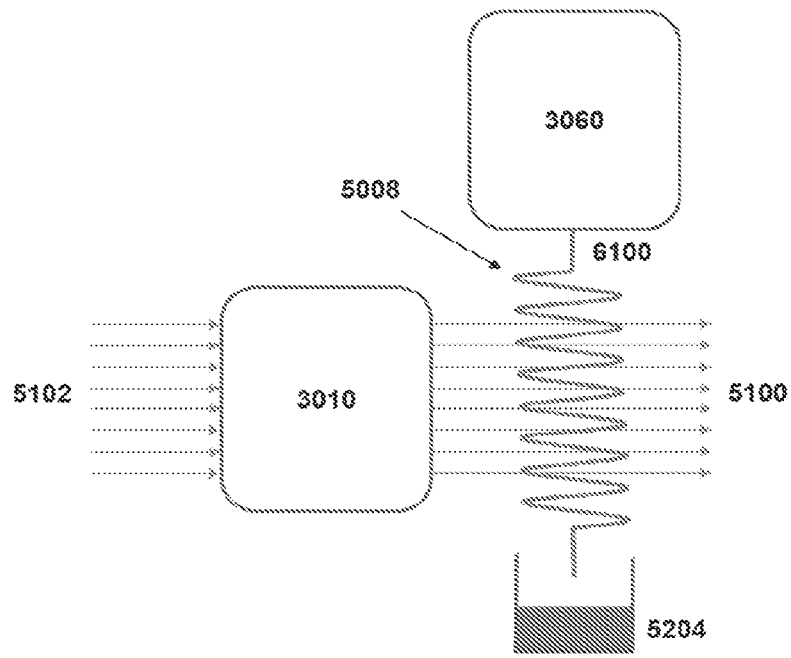
FIG. 7 depicts an exemplary process of adsorption, desorption and condensation using the water harvesting systems described herein to collect water from the atmosphere.

The steam that came out of the desorbing MOF layer was moved from the region of desorption to an area of condensation. In this example, the steam was sucked from the module in the desorption area by a small fan and sent to a helical tube type of condenser, which was placed inside of the carousel (FIGS. 5A, 5B, and 5C). The steam was cooled to room temperature by the air flowing around the coil, causing the water to condense and flow downwards to be collected inside of a collection tank. With reference to FIG. 7, surrounding air 5102 is circulated to module(s) 3010 in adsorption mode, recirculating or recycling air 5102 to cool condenser 5008, sending out air 5100, desorbing water from module(s) 3060 in desorption mode as steam 6100, condensing steam 6100 into water with condenser 5008, and collecting water with water tank 5204.

Results

Figure 8A:
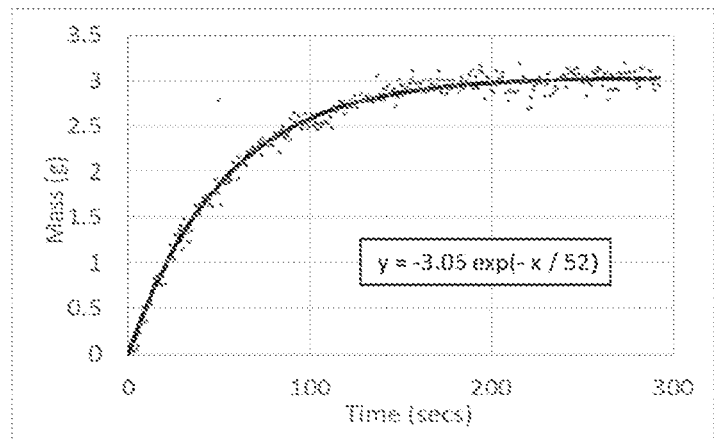
FIGS. 8A, 8B, and 8C depict graphs showing changes in the weight of a module in an exemplary water harvesting system.
Figure 8B:
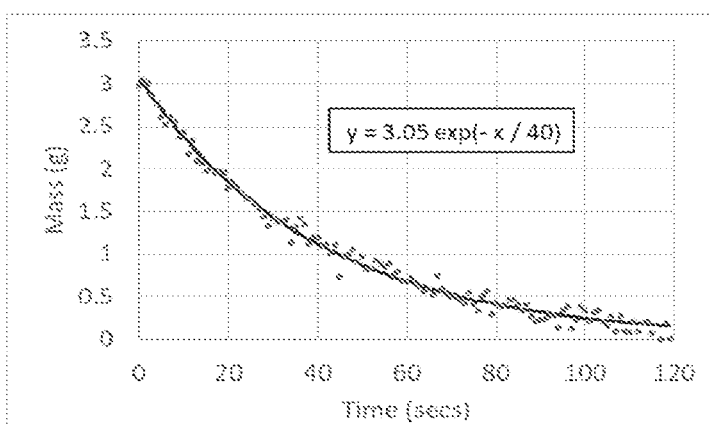
Figure 8C:
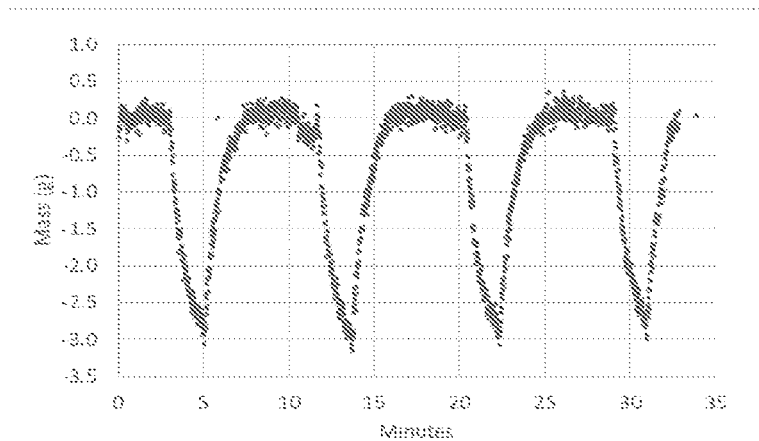
Figure 9:
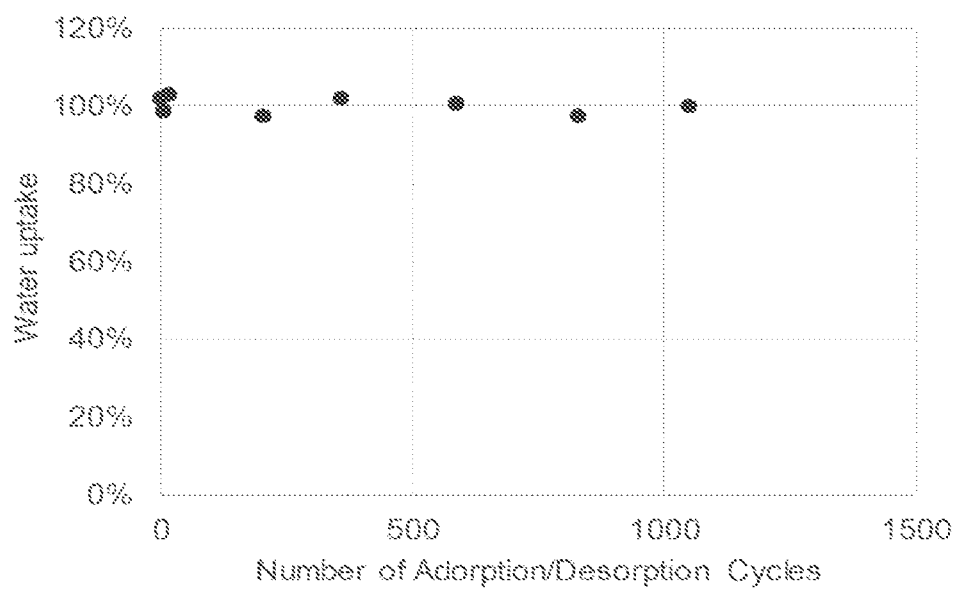
FIG. 9 depicts a graph showing relative water uptake with an exemplary water harvesting system, measured at various time points over the course of more than 1,000 adsorption/desorption cycles.

FIGS. 8A, 8B, and 8C show an example of the system performance. A module as illustrated in FIGS. 2A and 2B was placed on a precision scale. During adsorption (FIG. 8A), the weight of the module increased rapidly until about 3 grams of water was adsorbed. An exponential fit yielded a time constant of 52 seconds. During desorption (FIG. 8B), the weight of the module decreased even more rapidly, and about 3 grams of water was desorbed. An exponential fit yielded a time constant of 40 seconds. FIG. 8C shows multiple adsorption/desorption cycles, demonstrating the ability of this system to harvest water extremely efficiently. FIG. 9 shows the system reliability. After more than 1000 adsorption/desorption cycles, the water uptake is unchanged, demonstrating the excellent robustness of the system.

What is claimed is:

1. A water harvesting system, comprising:
   an adsorption/desorption unit, comprising:
      an adsorption sector;
      a desorption sector;
   a mode switching structure configured to position at least one of a plurality of modules in said adsorption sector and concurrently position at least one of said plurality of modules in said desorption sector,
      wherein the mode-switching structure comprises a rotating mechanism,
      wherein said plurality of modules connect to said rotating mechanism in a rotary configuration,
      wherein each of said plurality of modules includes a structural element,
      wherein said structural element supports a water capture material,
      wherein said at least one of said plurality of modules positioned in said adsorption sector adsorbs water from surrounding air on said water capture material,
      wherein said at least one of said plurality of modules positioned in said desorption sector desorbs water from said water capture material as water vapor; and
   a condenser positioned in proximity to said at least one of said plurality of modules in said desorption sector to condense water vapor into liquid water.

2. The system of claim 1, further comprising at least one steam redirecting unit, configured to redirect water vapor desorbed from said at least one of said plurality of modules in desorption sector to said condenser.

3. The system of claim 1, wherein each of said plurality of modules further comprises a frame connecting said structural elements.

4. A water harvesting system, comprising:
   an adsorption/desorption unit, comprising:
      a structural element,
         wherein said structural element supports a water capture material,
         wherein said water capture material adsorbs water from surrounding air when positioned in an adsorption sector of said adsorption/desorption unit,
         wherein said water capture material desorbs water as water vapor when positioned in a desorption sector of said adsorption/desorption unit;
   a heater configured to directly heat said structural element to desorb said water vapor from said water capture material, wherein said heater comprises an electrically conductive substrate resistively heated by a flow of electricity; and
   a condenser, positioned in proximity to said structural element, said condenser configured to condense water vapor into liquid water.

5. A water harvesting system, comprising:
   an adsorption/desorption unit, comprising:
      an adsorption sector;
      a desorption sector;
   a mode switching structure configured to operate at least one of a plurality of modules in said adsorption sector and concurrently operate at least one of said plurality of modules in said desorption sector,
      wherein each of said plurality of modules includes a plurality of plates disposed in radial or parallel spaced apart relation,
      wherein said plurality of plates supports a water capture material,
      wherein said at least one of said plurality of modules in said adsorption sector adsorbs water from surrounding air,
      wherein said at least one of said plurality of modules in said desorption sector desorbs water from said water capture material as water vapor; and
   a condenser positioned in proximity to said module in desorption mode, said condenser configured to condense water vapor into liquid water.

6. A water harvesting system, comprising:
   an adsorption/desorption unit, comprising:
      an adsorption sector;
      a desorption sector
      a plurality of modules arranged in a rotary configuration,
         wherein each of said plurality of modules includes a structural element,
         wherein said structural element is coated with a water capture material,
         wherein at least one of said plurality of modules positioned in said adsorption sector adsorbs water on said water capture material from surrounding air,
         wherein at least one of said plurality of modules positioned in said desorption sector desorbs water from said water capture material as water vapor; and
   a rotating mechanism, wherein said plurality of modules mount onto said rotating mechanism, said rotating mechanism configured to concurrently position said at least one of said plurality of modules from said adsorption sector to said desorption sector and position said at least one of said plurality of modules from said desorption sector to said adsorption sector;
   a condenser positioned in proximity to said at least one of said plurality of modules in said desorption sector, said condenser configured to condense said water vapor into liquid water.

7. The system of claim 6, further comprising a steam-redirecting unit configured to redirect said water vapor desorbed from said at least one of said plurality of modules positioned in said desorption sector to said condenser.

8. The system of claim 6, wherein said structural element comprises a metal plate.

9. The system of claim 8, wherein said metal plate comprises a plurality of metal plates disposed in radial or parallel spatial relation to each other.

10. The system of claim 6, wherein said water capture material comprises metal organic framework.

11. The system of claim 6, wherein said water capture material comprises a desiccant material.

12. The system of claim 6, further comprising a sealing structure configured to seal said at least one of said plurality of modules in said desorption sector.

13. The system of claim 6, further comprising a collection unit configured to receive said liquid water from said condenser.

14. A water harvesting system, comprising:
an adsorption/desorption unit, comprising:
an adsorption sector;
a desorption sector;
a plurality of modules arranged in a rotary configuration,
wherein each of said plurality of modules includes a structural element,
wherein said structural element is coated with a water capture material,
wherein said at least one of said plurality of modules positioned in said adsorption sector adsorbs water on said water capture material,
wherein at least one of said plurality of modules positioned in said desorption sector desorbs water from said water capture material as water vapor;
a rotating mechanism,
wherein said plurality of modules mount onto said rotating mechanism, said rotating mechanism configured to concurrently switch said at least one of said plurality of modules from said adsorption sector to said desorption sector and said at least one of said plurality of modules from said desorption sector to said adsorption sector; and
a condenser configured to condense said water vapor into liquid water, wherein said condenser disposed in the interior of said plurality of modules arranged in said rotary configuration.

15. The system of any one of claims 1, 4, 5, 6 and 14, further comprising a control system configured to monitor and control adsorption, desorption and condensation, wherein the control system comprises: at least one sensor; and at least one processor unit.

\* \* \* \* \*